United States Patent
Vetterick et al.

[19]

[11] Patent Number: 6,095,096
[45] Date of Patent: *Aug. 1, 2000

[54] INTEGRATED BOILER BURNER WITH BALANCED HEAT FLUX

[75] Inventors: Richard C. Vetterick; Patrick G. Whitten, both of Akron, Ohio

[73] Assignee: The Babcock & Wilcox Company, New Orleans, La.

[*] Notice: This patent issued on a continued prosecution application filed under 37 CFR 1.53(d), and is subject to the twenty year patent term provisions of 35 U.S.C. 154(a)(2).

[21] Appl. No.: 08/965,050

[22] Filed: Nov. 6, 1997

[51] Int. Cl.[7] .................................................. F22B 23/06
[52] U.S. Cl. ...................... 122/367.1; 122/6 A; 122/17.1
[58] Field of Search ............................... 122/367.1, 17.1, 122/250 R, 6 A

[56] References Cited

U.S. PATENT DOCUMENTS

| | | | |
|---|---|---|---|
| 4,809,645 | 3/1989 | Fournier et al. | 122/6 A |
| 5,410,989 | 5/1995 | Kendall et al. | 122/367.1 |
| 5,439,372 | 8/1995 | Duret et al. | 431/7 |
| 5,558,047 | 9/1996 | Vetterick | 122/367.1 |
| 5,575,243 | 11/1996 | Vetterick | 122/235.11 |

OTHER PUBLICATIONS

Steam, Its Generation and Use, 39th Edition Published 1978 pp. 26–5, Fig. 6, 13–2, Fig. 2; and 13–3 Text.
Steam, Its Generation and Use, 40th Edition Published 1992, Chapters 16, 25 & 29.

*Primary Examiner*—Denise L. Ferensic
*Assistant Examiner*—Jiping Lu
*Attorney, Agent, or Firm*—Robert J. Edwards; Eric Marich

[57] ABSTRACT

A package boiler having water cooled surfaces positioned relatively close to the combustion burner to improve the radiant heat transfer. Extended surfaces are added to the water cooled tube fireside surface to increase absorption rates to the limits established by water side conditions to avoid departure from nucleate boiling (DNB). The heat release rates of multiple firing rate zone burners are matched to the absorption rates of the water cooled surfaces by adjusting the size and extent of the various firing rate zones. The burner is extended or the physical shape is altered to expose a larger surface to greater areas of water cooled furnace surface. The burner is matched to cooling surface to lower combustion zone temperatures and thus thermal $NO_X$ formations. Further, recirculated flue gas, excess air, water vapor or a combination of these may be used to add mass to the fluid stream flowing through the burner. Finally, either the gas fuel or combustion air may be staged.

9 Claims, 4 Drawing Sheets

INTEGRATED BOILER BURNER WITH BALANCED HEAT FLUX

BACKGROUND OF THE INVENTION

1. Field of the Invention

The present invention relates generally to the field of heat exchange in industrial furnace boilers and in particular to an industrial package boiler having improved furnace gas temperature regulation due to a balanced heat flux between the burner heat release rate and the boiler heat absorption rate to minimize the creation of thermal $NO_X$ during the combustion process.

2. Description of the Related Art

Industrial power generation furnaces and boilers are well known for being a source of pollutants such as nitrogen and sulfur oxide compounds ($NO_X$ and $SO_X$), which are created during the combustion process. In recent years, many solutions for reducing the amounts of these pollutants into the atmosphere have been set forth. One method of reducing the amount of pollutants released is to simply reduce the amount of $NO_X$ and $SO_X$ created by the furnace combustion process.

Control of nitrogen oxide emissions ($NO_X$) in particular is important in the operation of industrial power generation furnaces and boilers, and other apparatus which use natural gas burners. Attempts to control $NO_X$ emissions have focused primarily upon the creation of "thermal $NO_X$", which is a portion of the total $NO_X$ emissions generated by combustion. Thermal $NO_X$ is formed by the oxidation of molecular nitrogen ($N_2$) at high temperatures.

Generally, when water tube boilers are fired with gas fuel, they are fired with diffusion type burners.

Circular burners are one type of diffusion burner which are frequently referred to where the combustion is initiated as the fuel and the combustion air pass through the circular throat. The result is a rapid mixing of fuel and air and almost immediate combustion with quick heat release creating high furnace gas temperatures, usually in the range of 2800° F. to 3000° F., and large amounts of $NO_X$ as the heat of combustion is liberated more rapidly than the water cooled furnace can absorb.

Several techniques for reducing the amount of $NO_X$ generated in diffusion burners have been devised, including methods which delay the combustion until the water cooled surface has a chance to absorb some of the heat and/or reducing combustion gas temperatures by changing the mass of the gas flow. However, the furnace gas temperatures still escalate to levels above the threshold of thermal $NO_X$ creation. Further, the burner can become unstable if the intermediate combustion process is delayed too long, or if the mass flow is increased too much.

Radiant burners are a surface burner type which can operate at much lower levels of $NO_X$ generation because much of the heat of combustion is radiated to the water cooled furnace walls and does not result in elevated combustion flue gas temperatures. One kind of radiant burner is a pre-mix burner in which gaseous fuel and combustion air are mixed prior to entry to the burner. Radiant burners have a relatively low heat release capacity, in the range of 100 kBtu/ft$^2$-hr of burner surface. The combustion process is very stable, even with rapid load changes. Despite this and other known benefits, capital costs are usually very high for use in large capacity boiler designs. One solution for overcoming high $NO_X$ generation is provided in U.S. Pat. No. 5,439,372, in which multiple radiant burners are fired in multiple zones to increase the total heat release rate while maintaining a lower $NO_X$ generation rate.

Multiple firing rate zone (MFRZ) burners have achieved a higher heat release rate than the radiant burners—in the range of 1,250 kBtu/ft$^2$-hr of burner surface. The $NO_X$ generation rate is also higher than that of a radiant burner, to which this type of burner is related. The combustion rate is higher than radiant burners and the combustion gas temperatures are elevated above the thermal $NO_X$ threshold before the water cooled furnace walls can absorb the extra heat. Multiple firing rate zone burners are also pre-mix burners and have a very stable combustion. U.S. Pat. No. 5,439,372 discloses one multiple firing rate zone burner for producing low $NO_X$ emissions.

SUMMARY OF THE INVENTION

It is an object of the present invention to provide a package boiler with a balanced heat flux, so that the furnace gas temperature may be regulated and maintained below a temperature at which thermal $NO_X$ is formed.

Accordingly, the invention provides a boiler which addresses the thermal $NO_X$ generation characteristics of a multiple firing rate zone (MFRZ) burner by balancing the heat release rate of the burner with the absorption rate of the water cooled furnace walls, roof and floor so that the combustion gases cannot reach and/or remain at the threshold temperature for the generation of thermal $NO_X$, approximately 2400° F.

A boiler according to the invention has the water cooled surfaces positioned relatively close to the combustion burner to improve the radiant heat transfer. Extended surfaces can be added to the water cooled tube fireside surface to increase absorption rates to the limits established by water side conditions to avoid departure from nucleate boiling (DNB). The heat release rates of the multiple firing rate zone burner are matched to the absorption rates of the water cooled surfaces by adjusting the size and extent of the burner and its various firing rate zones. The burner is extended or the physical shape is altered to expose a larger surface to greater areas of water cooled furnace surface and thus enhancing radiant heat transfer. Further, recirculated flue gas, excess air, water vapor or a combination of these may be used to add mass to the fluid stream flowing through the burner lowering $NO_X$ formation. Finally, either the gas fuel or combustion air may be staged.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
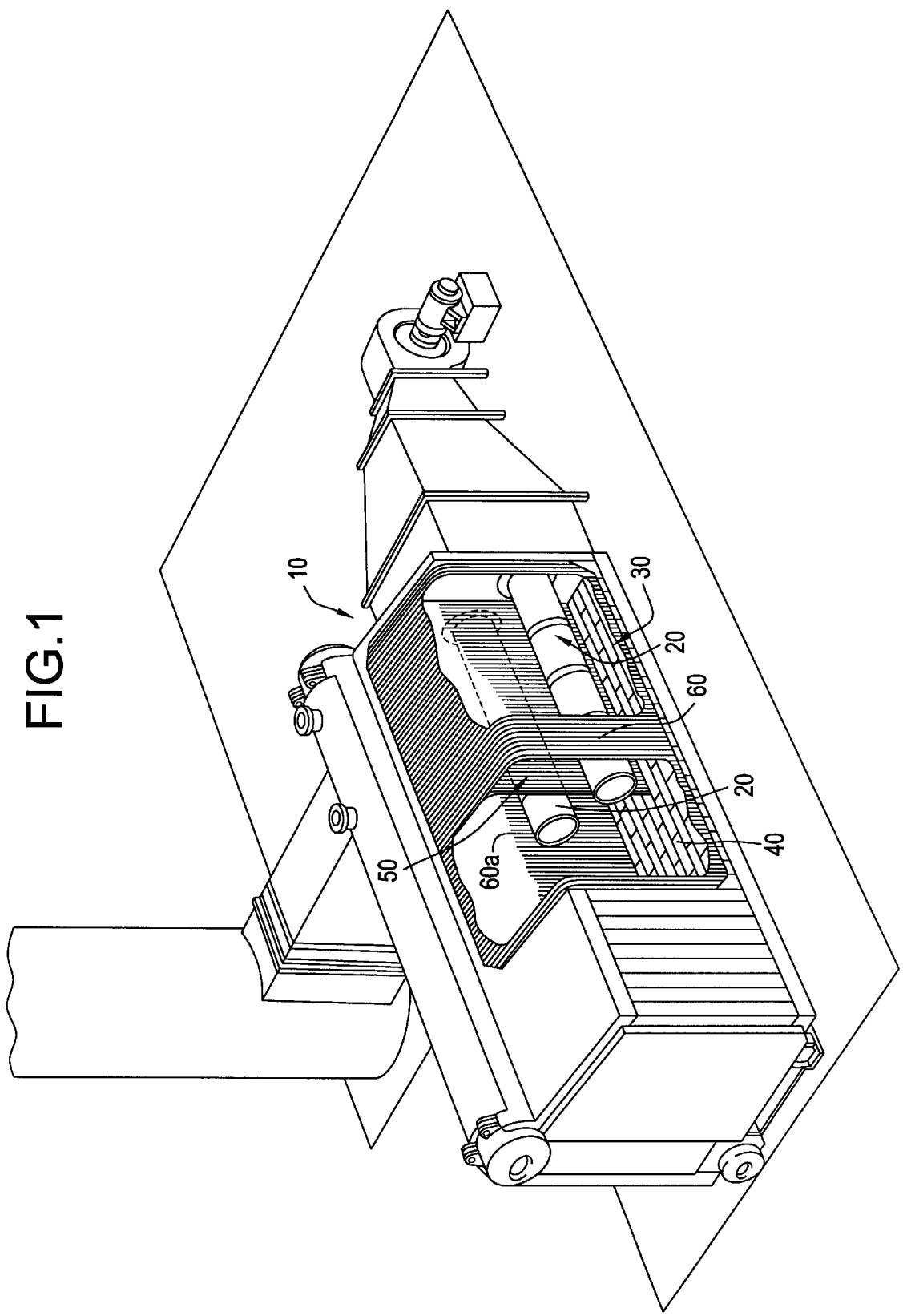
FIG. 1 is a partial sectional perspective view of a package boiler according to the invention.
Figure 3:
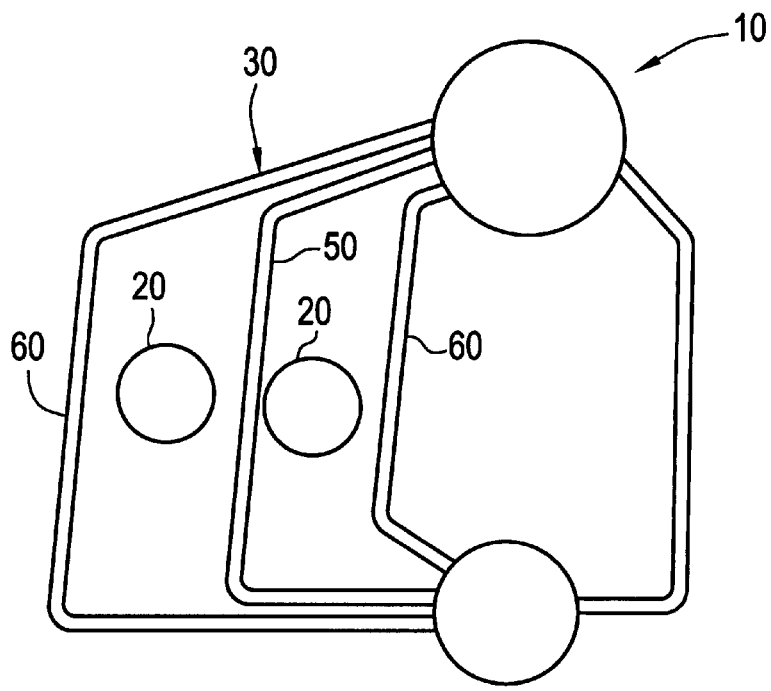
FIG. 3 is a front elevational view of the package boiler of FIG. 1.

Referring now to the drawings, in which like reference numerals are used to refer to the same or similar elements, FIGS. 1 and 3 show a package boiler 10 having a pair of MFRZ burners 20 in the furnace side 30 of the package boiler 10. The MFRZ burners 20 are arranged one on either side of an inner furnace wall of chill tubes 50. The outer furnace walls 60 are membrane-type water cooled walls. The furnace side floor 40 may be water cooled surface covered with refractory material.

In this embodiment, the MFRZ burners 20 are elongated so that they release heat progressively through the furnace side 30. The centrally positioned chill tubes 50 add heat absorption capability to the water-cooled furnace walls 60 and division wall 60a.

The furnace gas temperature can be accurately controlled by designing the relative position of the MFRZ burners 20 with respect to the inner wall of chill tubes 50 and furnace walls 60 so that the heat released by the MFRZ burners 20 is adequately absorbed by the flue gases and the chill tubes 50 and furnace walls 60. The addition of water cooled surfaces such as chill tubes 50 increases the absorption capability.

The continuous release of heat from MFRZ burners 20 along the length of furnace side 30 rather than at a single combustion point works to reduce concentrated zones of elevated temperatures in the furnace side. In this manner, a relatively constant but reduced furnace side 30 temperature may be maintained. The package boiler 10 can then be designed and operated with the furnace side 30 temperature at a point approaching, but still below, the temperature at which thermal $NO_X$ forms. Other features which may be used to this end in combination or apart from these design considerations are described below.

Figure 2:
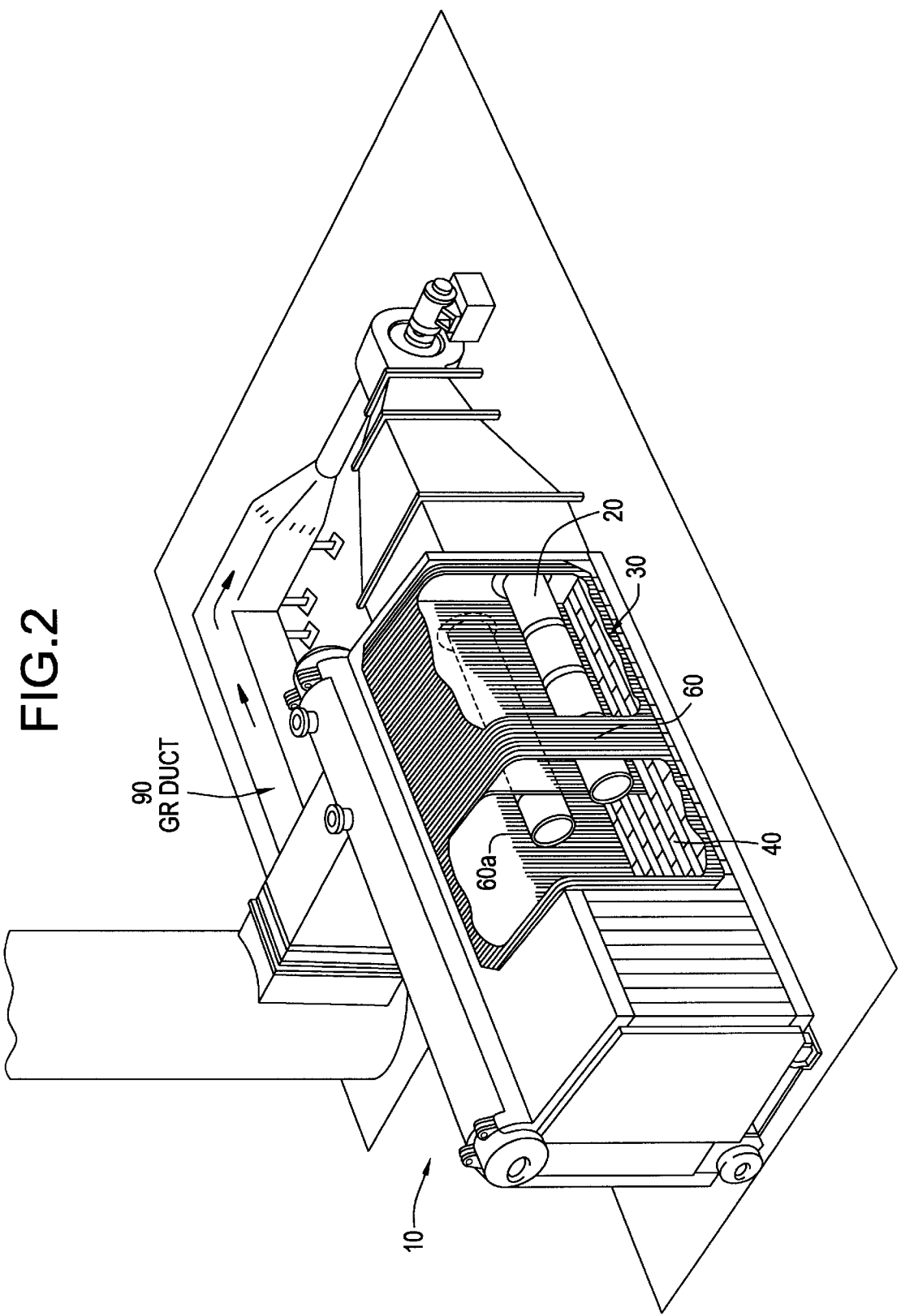
FIG. 2 is a partial sectional perspective view of a package boiler displaying another embodiment of the invention.

As seen in FIG. 2, flue gas return 90 is added to the package boiler 10 to recirculate flue gases into the furnace side 30. The recirculation of flue gases adds mass to the flow through the furnace, and by doing so tempers the peak combustion temperatures in the furnace side 30 of the package boiler 10.

Figure 4:
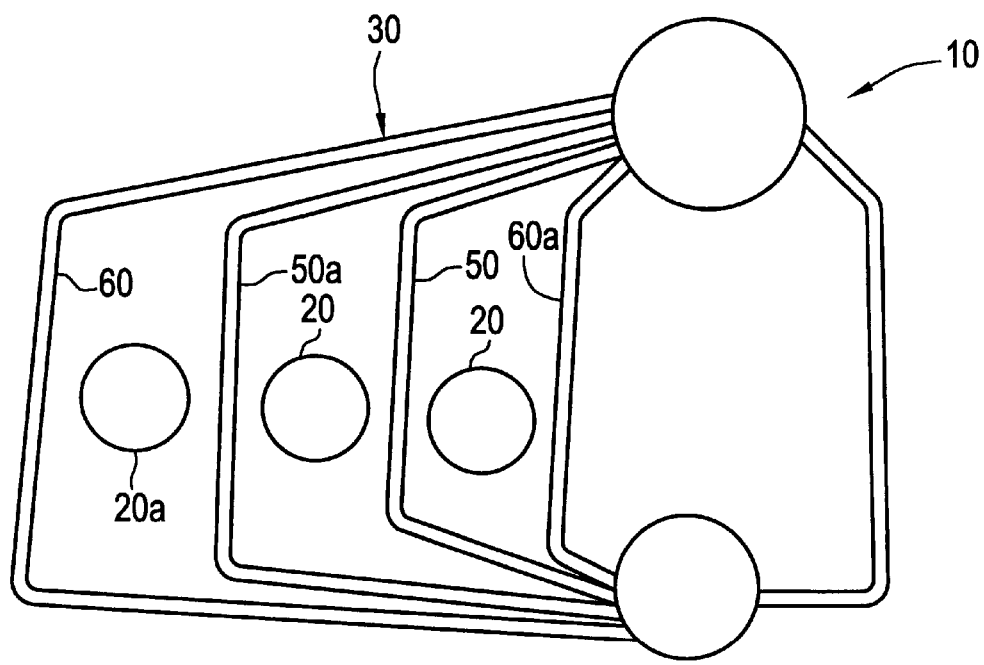
FIG. 4 is a front elevational view of a section of a package boiler in a third embodiment according to the invention.
Figure 5:
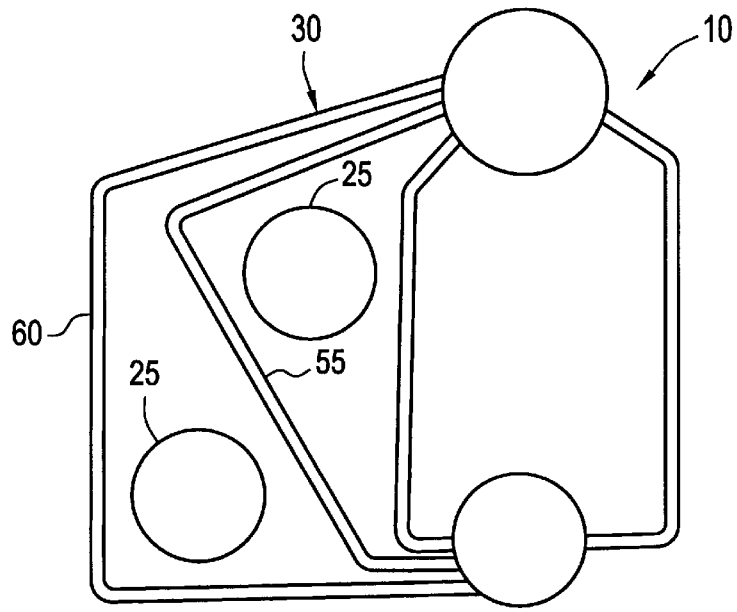
FIG. 5 is a front elevational view of a section of a package boiler in a fourth embodiment of the invention.

Alternate furnace side 30 configurations for the package boiler 10 are shown in FIGS. 4 and 5. In FIG. 4, a third MFRZ burner 20a is added to the furnace side 30 and a second inner wall of chill tubes 50a is placed between the third MFRZ burner 20a and the adjacent MFRZ burner 20. FIG. 5 shows a package boiler 10 incorporating a pair of large MFRZ burners 25 in a vertically offset arrangement. The inner wall of chill tubes 55 is angled obliquely to the vertical between the pair of large MFRZ burners 25.

Figure 6:
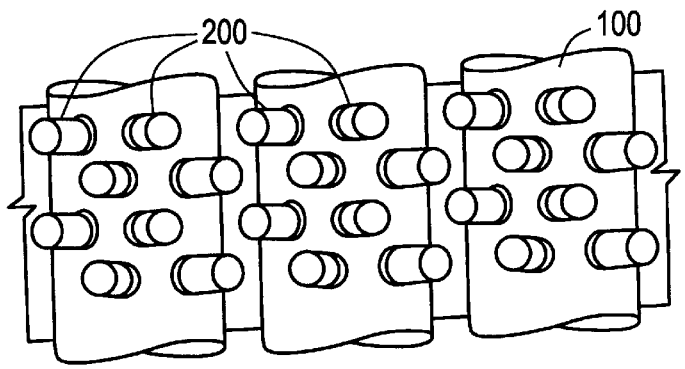
FIG. 6 is a front elevational view of a section of a water cooled surface with extended surface used with the invention.
Figure 7:
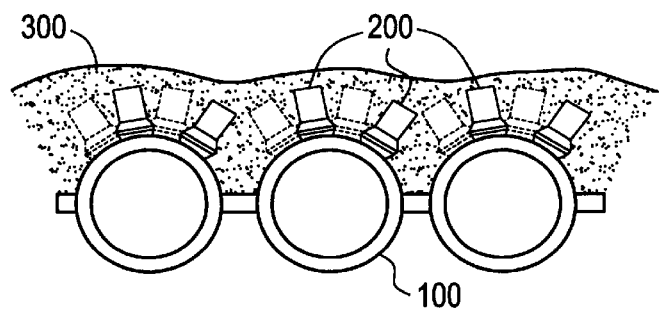
FIG. 7 is a side elevational view of a section of a second embodiment of a water cooled surface used with the invention.

FIGS. 6 and 7 display water-cooled wall sections 100 with extended surfaces 200 in the form of studs arranged in rows of pairs. The wall section 100 and extended surfaces 200 are covered by refractory material 300 in FIG. 7. The refractory material 300 reduces the heat absorption rate of the wall section 100 in FIG. 7 relative to the uncovered wall section of FIG. 6.

These cooling surface extensions may be used in combination with the other configurations of the invention to balance the heat flux between the heat released by combustion and the heat absorbed by the water-cooled surfaces.

It is anticipated that an integrated boiler burner, such as a package boiler, having balanced heat flux can be designed to have relatively low peak combustion temperatures. The heat released by the burners 20 is balanced to the heat absorbed by the flue gas and the heat absorbed into the water-cooled furnace surfaces so that the furnace gas temperatures are held to a level below that at which thermal $NO_X$ forms.

For example, the burners in a package boiler of the invention may liberate 1,250 $kBtu/ft^2$-hr of burner surface, of which 70%–75% may be absorbed by flue gases and the remainder is absorbed by the water-cooled furnace surfaces. Using the design features described above, such as releasing burner heat progressively along the length of the furnace side, adding water-cooled surface area facing the burners with extensions, such as the studs 200 shown in FIGS. 6 and 7, and adjusting the relative position of the burners to the water-cooled surfaces, the package boiler can be operated with balanced heat release/absorption rates. If necessary, the recirculated flue gas may be introduced to further moderate maximum combustion gas temperature.

While specific embodiments of the invention have been shown and described in detail to illustrate the application of the principles of the invention, it will be understood that the invention may be embodied otherwise without departing from such principles.

What is claimed is:

1. A package boiler comprising:
    a boiler housing having two sides, one side being a furnace side, a furnace side enclosure formed by water-cooled membrane tube walls, a floor and a ceiling;
    at least a pair of multiple firing rate zone burners extending from a first end of the furnace side toward a second end between the water-cooled membrane tube walls, the burners having an operating heat release rate which is substantially constant between the first and second ends of the furnace side; and
    at least one water-cooled wall of chill tubes extending between the floor and ceiling of the furnace side, each at least one water-cooled wall of chill tubes being located between adjacent ones of the at least a pair of multiple firing rate burners; and
    wherein the heat released by the multiple firing rate zone burners is balanced to the heat absorbed by the flue gas and the heat absorbed into the water-cooled furnace surfaces so that the furnace gas temperatures inside the boiler are held to a level below 2400° F. the temperature at which thermal $NO_X$ forms.

2. A package boiler according to claim 1, further comprising a multiplicity of cooling surface extensions attached to the at least one water-cooled wall of chill tubes.

3. A package boiler according to claim 2, wherein the cooling surface extensions comprise studs.

4. A package boiler according to claim 3, wherein the studs are covered by a refractory material.

5. A package boiler according to claim 2, wherein the cooling surface extensions are covered by refractory material.

6. A package boiler according to claim 1, wherein the at least a pair of multiple firing rate zone burners comprises two multiple firing rate zone burners.

7. A package boiler according to claim 6, wherein the at least one water-cooled chill tube wall comprises one chill tube wall.

8. A package boiler according to claim 7, wherein the one chill tube wall further comprises a multiplicity of cooling surface extensions.

9. A package boiler according to claim 8, wherein the cooling surface extensions are covered by a refractory material.

* * * * *